No. 891,584. PATENTED JUNE 23, 1908.
L. A. ASPINWALL.
BEEHIVE.
APPLICATION FILED FEB. 3, 1908.
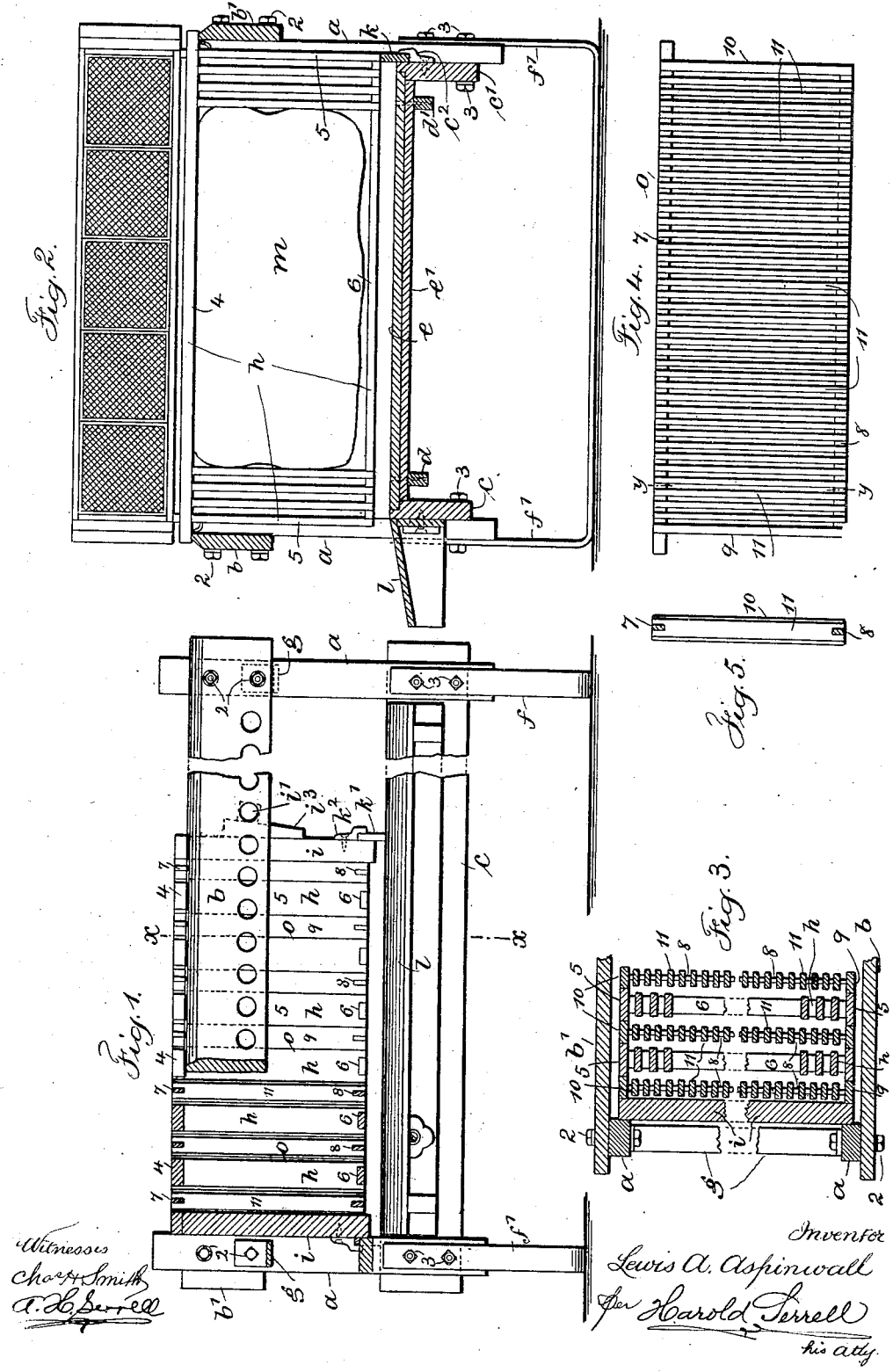

UNITED STATES PATENT OFFICE.

LEWIS AUGUSTUS ASPINWALL, OF JACKSON, MICHIGAN.

BEEHIVE.

No. 891,584.  Specification of Letters Patent.  Patented June 23, 1908.

Application filed February 3, 1908. Serial No. 413,970.

*To all whom it may concern:*

Be it known that I, LEWIS AUGUSTUS ASPINWALL, a citizen of the United States, residing at Jackson, in the county of Jackson and State of Michigan, have invented an Improvement in Beehives, of which the following is a specification.

My present invention is an improvement upon the devices described and shown in my Patent No. 653331, July 10th, 1900, and my invention relates to an element adapted for use with the structure shown and described in an application prepared by me of even date herewith.

My present invention relates particularly to slatted or dummy frames adapted to be placed between and to alternate with the combs or brood frames, as generally shown in my aforesaid Letters Patent.

In the slatted or dummy frames of my aforesaid patent, I employed wide top bars the same in width as those of the comb frames and alternating with them. The spaces between the two being what is termed a bee space, did not afford ample communication between the brood apartment and comb honey super for the maximum storage of honey and the complete prevention of swarming.

In the natural abode of bees, but one apartment is found and all the honey therein is accessible to the colony during the winter, while in modern hives, the upper story or series of supers for honey is comparatively difficult of access.

The object of my present invention is to increase the opening of the slatted frames sufficiently at the top, rendering greater accessibility to the supers and so lessen the crowded condition and more effectually overcome the swarming impulse.

With this object in view, my invention relates particularly to the construction of the slatted or dummy frames which I construct with narrow top and bottom bars and with vertical end pieces of a narrow and predetermined width to come between the brood or comb frames and therewith to close up the ends and with intermediate slats spaced equally apart and which are wider than the top and bottom bars but narrower than the end pieces, thus giving ample bee standing room and accommodation not only between the respective slats but between the slats collectively and the slats and combs of the comb frame and so afford abundant communication between the brood apartment and the super.

In the drawing, Figure 1 is a front elevation and partial section representing the complete hive of my invention. Fig. 2 is a cross section of the same at about the dotted line $x, x$, of Fig. 1. Fig. 3 is a partial sectional plan at one end of the hive. Fig. 4 is a side elevation of one of the slatted or dummy frames, and Fig. 5 is a section at the dotted line $y, y$, of Fig. 4.

Referring particularly to Figs. 1 and 2, the rack or holder for the comb frames and slatted or dummy frames is preferably formed the same as the device described and shown in an application filed by me of even date herewith,—that is to say, this rack or holder is composed of four up-right end or corner members $a$, two longitudinal members $b\ b'$ secured thereto by the bolts 2 and upon the outer surfaces of said corner members and which longitudinal members form the supports for the comb frames and slatted or dummy frames which are preferably placed alternating with one another; the said longitudinal members are each arranged with a row of spaced apart perforations near the lower edge.

$c\ c'$ represent longitudinal members secured to the upright end members $a$ by bolts 3 upon the inner surfaces of the said upright members. The inner or upper edges of the members $c\ c'$ are rabbeted to receive and support the bottom boards $e\ e'$. These boards are ship-lapped, or in other words, overlapped the one upon the other, so that the joints are off-set and they are connected by cleats $d\ d'$, to which they are securely nailed.

The rack or frame support of my improved beehive is carried in an elevated position above the ground by the bent or U-shaped metal supports $f\ f'$, the free ends of which are bolted to the upright corner members $a$ by the same bolts 3 which securely hold together the said upright members and the longitudinal members $c\ c'$.

The metal supports extend across from one upright to the other, constituting a bearing over their entire width in the ground, at the same time serving to hold together and determine the relation of the upright end members *a*. In connection with these metal supports *f f'* I have shown and prefer to employ the metal stays *g* which extend across between the upright end members *a* and substantially between the longitudinal frame members *b b'*.

The comb frames shown, agree in construction with the similar parts of my application Serial No. 413,969 of like date herewith; each comb frame *h* having a top member or bar 4, vertical end pieces or members 5 which are slightly wider than the top member 4 and the edges of which come against the edges of the slatted frames. The ends of the top bar overhang the end pieces 5 and rest upon the upper edges of the frame members *b b'*. The bottom bar 6 is considerably narrower than the top bar 4 and I provide several slats that are narrower than the end piece 5, wider than the bottom bar 6 and the same width as the top bar so as to leave as shown in the drawing, quite an appreciable center space in the comb-frames in which to place and secure the brood comb *m*.

The drawing also shows the closing boards *i* preferably at both ends of the hive coming against the comb frames, or the slatted frames to close up the ends of the hive; also a locking bar *i'*, with round ends to pass into the round openings in the frame members *b b'* and a wedge *i³* which comes between the locking bar and the follower-board adjacent thereto.

I prefer to employ closing strips *k k'* which are held in position against or adjacent to the lower edges of the comb frames and closing board *i* by the metal buttons *c²* *k²*; these closing strips serving to shut off access to the sides of the hive so as to leave an open space below the series of comb frames and between the same and the bottom boards *e e'* and adjacent to the alighting board *l* which latter alighting board preferably is made removable.

The slatted or dummy frames *o* which come between the comb frames are each composed of narrow top and bottom bars 7 8, end pieces 9 and 10 and slats 11, which are preferably equally spaced apart and which are wider than the top and bottom bars 7 8 and narrower than the end pieces 9 10. These end pieces in their distance apart along the top and bottom bars, agree with the position of the vertical end pieces 5 of the comb frames; the top bars being prolonged beyond these end pieces so as to extend over, rest upon and be supported by the frame members *b b'*. Fig. 3 in the sectional plan shows the relation of these parts.

The slats 11 are spaced apart a full quarter of an inch, or bee space, while the distance between the vertical plane of the edges of the slats 11 and the vertical plane of the top bars 7 and the surface of the comb frame is equal to several bee spaces, thus providing ample space between the planes of the comb surfaces including the top bars of the comb and slatted frames, so that the bees on the respective parts will have ample space to move freely upwards between the parts.

The cross section Fig. 2, indicates the position occupied by the supers above the comb frames and dummy frames and Fig. 1 indicates clearly the space provided at the upper ends of the comb frames and dummy frames and between the top bar 4 of the comb frames and narrow top bar 7 of the dummy frames for the passage of bees from the lower to the upper stories of the hive, which provides sufficient room so that the movement of the bees is substantially unrestricted.

In my present hive, by the use of slatted or dummy frames and the comb frames, additional bee space and length of hive is furnished without increasing the comb area. This is important as the increased number of comb cells beyond the laying capacity of the queen bee would result in the storage of honey therein which would detract proportionately from the storage of comb honey in the supers placed above, also increasing the tendency of the bees by overcrowding to swarm. In this device the increased room provided by combining slatted frames with the comb frames provided with slatted ends increases the standing room for the bees, lessening the crowded condition of the colony and more effectually overcoming the swarming impulse. As these slatted frames are useful only in the summer season and dispensed within winter and for this reason, parts of these slatted frames may be made of metal if desired, especially the top bars, because any objection to the bars of metal being cold would be negligible. I further in this improvement eliminate the wide top bars in the slatted frames or dummies, for I have demonstrated that the wide top bars and the narrow spaces employed in modern hives separate the two apartments to such an extent that the bees reluctantly enter the upper story for the storage of honey. I thus provide a greater and more perfect communication between the brood and the storage apartment and in such a proportion that the storage of honey will be increased in the supers because the bees refuse to work with their fullest energy unless the accommodation is ample, their instinct in storing honey for the winter causing them to store it in the brood combs when the communication is insufficient, but where it is sufficient to store it in the supers provided therefor.

I claim as my invention:

1. In a beehive and in combination with a suitable supporting frame and the comb frames, of slatted or dummy frames adapted to be placed between the comb frames and each comprising perpendicular end pieces adapted to contact and aline with the end pieces of the comb frames and having narrow top and bottom bars and spaced apart intermediate bars.

2. In a beehive and in combination with a supporting frame and the comb frames, of slatted or dummy frames adapted to be placed between the comb frames and each comprising end pieces whose edges are adapted to contact with the end pieces of the comb frames, edge to edge, and so close up the hive, said slatted or dummy frames also having narrow top and bottom bars and spaced apart vertical bars intermediate of the end pieces which are wider than the top and bottom bars and narrower than the end pieces.

3. In a beehive and in combination with a suitable frame support having longitudinal frame members $b$ $b'$, of a series of comb frames and a series of alternately placed slatted or dummy frames, each frame of the respective series having end members or strips that contact, and top bars which overhang or extend beyond the end members, or overhang and are adapted to extend over and be supported upon the upper edges of the frame members $b$ $b'$, the said comb frames being each adapted to receive a brood comb centrally placed and the slatted or dummy frames providing ample standing room for the bees.

4. In a beehive and in combination with the longitudinal frame supports $b$ $b'$, of a series of comb frames each comprising a top bar, vertical end pieces, a bottom bar, a series of slats parallel with and adjacent to the end pieces leaving a center space for the brood comb, and a series of slatted or dummy frames adapted to be placed intermediate or alternately with the comb frames, each comprising narrow top and bottom bars, end pieces which contact with the end pieces of the comb frames to close up the hive and spaced apart slats extending between the endpieces, the respective top bars of both series of comb frames and dummy frames extending beyond the end pieces and resting upon and supported by the longitudinal frame members $b$ $b'$.

Signed by me this ninth day of Jan. 1908.

LEWIS AUGUSTUS ASPINWALL.

Witnesses:
C. G. ROWLEY,
GEO. N. WHITNEY.